United States Patent
Casati

(10) Patent No.: US 11,223,947 B2
(45) Date of Patent: Jan. 11, 2022

(54) ENHANCED REGISTRATION PROCEDURE IN A MOBILE SYSTEM SUPPORTING NETWORK SLICING

(71) Applicant: NOKIA TECHNOLOGIES OY, Espoo (FI)

(72) Inventor: Alessio Casati, Swindon (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/495,511

(22) PCT Filed: Mar. 21, 2017

(86) PCT No.: PCT/EP2017/056625
§ 371 (c)(1),
(2) Date: Sep. 19, 2019

(87) PCT Pub. No.: WO2018/171863
PCT Pub. Date: Sep. 27, 2018

(65) Prior Publication Data
US 2020/0100173 A1   Mar. 26, 2020

(51) Int. Cl.
*H04W 48/18* (2009.01)
*H04W 8/20* (2009.01)
(Continued)

(52) U.S. Cl.
CPC ............ *H04W 12/06* (2013.01); *H04L 63/08* (2013.01); *H04L 63/102* (2013.01); *H04W 8/20* (2013.01); *H04W 48/18* (2013.01)

(58) Field of Classification Search
CPC ....... H04W 12/06; H04W 8/20; H04W 48/18; H04L 63/08; H04L 63/102
See application file for complete search history.

(56) References Cited

U.S. PATENT DOCUMENTS

| 2004/0176091 | A1 | 9/2004 | Bajko et al. |
| 2013/0058776 | A1 | 3/2013 | Domercq et al. |

(Continued)

FOREIGN PATENT DOCUMENTS

| BR | 112012027172 A2 | 7/2016 |
| CN | 106375987 A | 2/2017 |
| RU | 2287911 C2 | 11/2016 |

OTHER PUBLICATIONS

Office Action for Korean Application No. 2019-7027485 dated Mar. 9, 2020, 5 pages.
(Continued)

*Primary Examiner* — Minjung Kim
(74) *Attorney, Agent, or Firm* — Alston & Bird LLP

(57) ABSTRACT

Embodiments of the invention include a mobile network entity, such as Access and Mobility Management Function AMF, providing registration management functions in a mobile network supporting network slicing, said mobile network entity configured to:—check if authentication and/or authorization involving a third party associated with a network slice is required for access to said network slice in addition to authentication and/or authorization for access to said mobile network, during registration,—initiate said authentication and/or authorization involving said third party upon checking that said authentication and/or authorization involving said third party is required.

14 Claims, 3 Drawing Sheets

Figure 1:
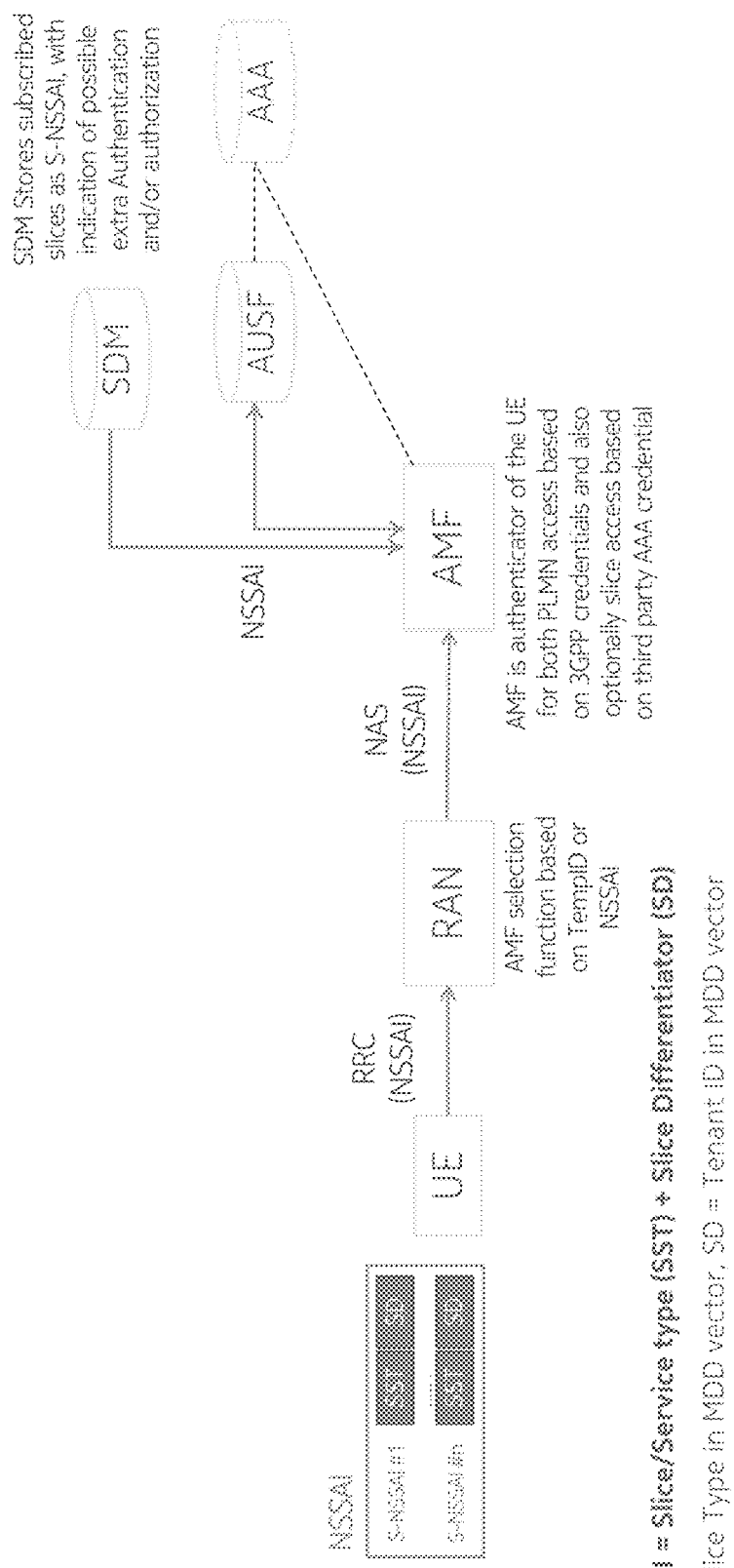

(51) Int. Cl.
*H04L 29/06* (2006.01)
*H04W 12/06* (2021.01)

(56) References Cited

U.S. PATENT DOCUMENTS

| | | | |
|---|---|---|---|
| 2017/0070892 | A1 | 3/2017 | Song et al. |
| 2017/0086165 | A1 | 3/2017 | Tarradell et al. |
| 2017/0164212 | A1* | 6/2017 | Opsenica ............ H04L 41/0246 |
| 2017/0303259 | A1* | 10/2017 | Lee ..................... H04W 72/048 |
| 2018/0317086 | A1* | 11/2018 | Ben Henda ....... H04W 12/0602 |
| 2019/0021047 | A1 | 1/2019 | Zong |
| 2020/0053083 | A1* | 2/2020 | Kunz .................... H04W 12/06 |
| 2020/0128614 | A1* | 4/2020 | Ying ....................... H04L 29/08 |

OTHER PUBLICATIONS

International Search Report and Written Opinion for Application No. PCT/EP2017/056625 dated Oct. 17, 2020, 10 pages.

3rd Generation Partnership Project; Technical Specification Group Services and Suystems Aspects; Study on the Security Aspects of the Next Generation Systems (Release 14); 3GPP TR 33.899, vol. SA WG3, No. V1.0.0 (Mar. 2017) 473 pages.

3rd Generation Partnetship Project; Technical Specification Group Services and Systems Aspects; General Packet Radion service (GPRS) Enhancement for Evolved Universal Terrestrial Radio Access Network (E-UTRAN) access (Release 14) 3GPP TS 23.401 V14.3.3 (Mar. 2017) 386 pages.

3rd Generation Partnership Project; Technical Specification Group Services and System Aspects; Study on Architecture for Next Generation System (Release 14) 3GPP TR 23.799 V14.0.0 (Dec. 2016) 522 pages.

3rd Generation Partnership Project; technical Specification Group Services and Systems Aspects; Architecture Enhancements to Facilitate Communications With Packet Data Networks and Applications (Release 15) 3GPP TS 23.682 V15.0.0 (Mar. 2017) 109 pages.

3rd Generation Partnetship Project; Technical Specification Group Services and System Aspects; System Architecture for the5G System; Stage 2 (Release 15) 3GPP TS 23.501 V0.3.1 (Mar. 2017) 101 pages.

3rd Generation Partnership Project; Technical Specification Group Services and System Aspects; Procedures for the 5G System; Stage 2 (Release 15) 3GPP TS 23.502 V0.2.0 (Feb. 2017) 80 pages.

3rd Generation Partnership Project; Technical Specification Group Core Network and Terminals; Interworking Between the Public Land Mobile Network (PLMN) Supporting Packing Based Services and Packet Data Networks (PDN) (Release 14) 3GPP TS 29.061 V14.3.0 (Mar. 2017) 171 pages.

Aboda, B. et al., *The Network Access Identifier*, RFC 4282 (Dec. 2005) 16 pages.

Merge of S3-2701770S3-170279 S3-170298 EAP Based Secondary Authentication Proposals, 3GPP Draft; S3-170405 WAS S3-170177 S3-170279 S3-270298, 3rd Generation Partnership Project (EGPP) vol. SA WG3, Nokia (Feb. 2017).

Proposed Network Slicing Update to 23.501 Clause 5.15. 3GPP Draft; S2-171622 WAS 1617 WAS 1599 WAS 1596 WAS 1547 WAS 1464WAS1023-NS Arch Update Clause 5.15 D1, 3rd Generation Partnership Project, vol. SA WG2, ZTE et al. (Feb. 2017) 4 pages.

Office Action for Russian Application No. 2019129681/07 dated May 12, 2020, 10 pages.

Office Action for Vietnamese Application No. 1-2019-05503 dated Nov. 27, 2019, 2 pages.

Office Action for Canadian Patent Application No. 3,057,401, dated Nov. 9, 2020, 4 pages.

Communication Pursuant to Article 94(3) EPC for European Application No. 17713599.3 dated Feb. 16, 2021, 5 pages.

First Examination Report for Indian Application No. 201917042060 dated Feb. 24, 2021, 7 pages.

Office Action for Japanese Patent Application No. 2019-552487 dated Dec. 22, 2020, with English translation, 14 pages.

3GPP TSG-SA Meeting #75; Tdoc SP-170096; Dubrovnik, Croatia, Mar. 8-10, 2017; Title: Presentation of Specification/Report to TSG: TR 33.899, Version 1.0.0; Source: SA3; Document for: Information, 2 pages.

Search Report and Written Opinion for Singapore Patent Application No. 11201908469U dated Dec. 24, 2020, 7 pages.

LG Electronics Inc., "Network Slice Selection Considering Authentication and Authorization", SA WG2 Meeting #116, S2-163395, (Jul. 11-15, 2016), 6 pages.

Office Action for Japanese Application No. 2019-552487 dated Aug. 24, 2021, 17 pages.

Office Action for Canadian Patent Application No. 3,057,401, dated Sep. 22, 2021, 3 pages.

Office Action for Chinese Application No. 201680058413.2 dated Nov. 19, 2021, 12 pages.

* cited by examiner

ENHANCED REGISTRATION PROCEDURE IN A MOBILE SYSTEM SUPPORTING NETWORK SLICING

CROSS-REFERENCE TO RELATED APPLICATIONS

The present application is a national phase entry of International Application No. PCT/EP2017/056625, filed Mar. 21, 2017, the contents of which are incorporated herein by reference in its entirety.

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

In general, in a mobile system, a user/User Equipment (UE) has access to services provided by a mobile network. A mobile network generally comprises a Core Network accessed via an Access Network, such as a Radio Access Network.

An example of mobile system is Next Generation (Next Gen) system, also referred to as 5G system, currently being specified by 3GPP, such as in 3GPP TR 23.799, 3GPP TS 23.501 and 3GPP TS 23.502.

One concept used in Next Generation (or 5G) mobile networks is the concept of network slicing. As indicated for example in 3GPP TS 23.501, the operator may deploy multiple Network Slice instances delivering exactly the same features but for different groups of UEs, e.g. as they deliver a different committed service and/or because they may be dedicated to a customer.

The introduction of network slicing in such networks and systems brings new technical issues requiring new solutions. An example of such new technical issues is that network slicing may introduce new stakeholders in the system end-to-end chain that may require independent authentication and/or authorization.

There is a need to address such new technical issues. Embodiments of the invention in particular address such needs.

These and other objects are achieved, in one aspect, by a mobile network entity, such as Access and Mobility Management Function AMF, providing registration management functions in a mobile network supporting network slicing, said mobile network entity configured to:
  check if authentication and/or authorization involving a third party associated with a network slice is required for access to said network slice in addition to authentication and/or authorization for access to said mobile network, during registration,
  initiate said authentication and/or authorization involving said third party upon checking that said authentication and/or authorization involving said third party is required.

These and other objects are achieved, in another aspect, by a mobile network subscriber database, such as SDM, for a mobile network supporting network slicing, said mobile network subscriber database configured to:
  store subscription data indicating whether authentication and/or authorization involving a third party associated with a network slice is required for access to said network slice, in addition to authentication and/or authorization for access to said mobile network.

These and other objects are achieved, in another aspect, by a User Equipment for a mobile system supporting network slicing, said User Equipment configured to:
  support authentication and/or authorization involving a third party associated with a network slice, for access to said network slice, in addition to authentication and/or authorization for access to said network, if required for said network slice, during registration.

These and other objects are achieved, in another aspect, by a mobile network entity, such as AUSF, providing authentication server functions in a mobile network supporting network slicing, said mobile network entity configured to:
  relay information exchanged between a mobile network entity such as Access and Mobility Management Function AMF providing registration management functions, and a AAA server referred to as third party AAA server associated with a third party associated with a network slice, in an authentication and/or authorization procedure performed for access to said network slice.

These and other objects are achieved, in another aspect, by a method for enhanced registration in a mobile system supporting network slicing, said method including at least one step performed by at least one of the thus configured entities: mobile network entity such as Access and Mobility Management Function AMF providing registration management functions, mobile network subscriber database such as SDM, User Equipment UE, mobile network entity such as AUSF providing authentication server functions.

Figure 2:
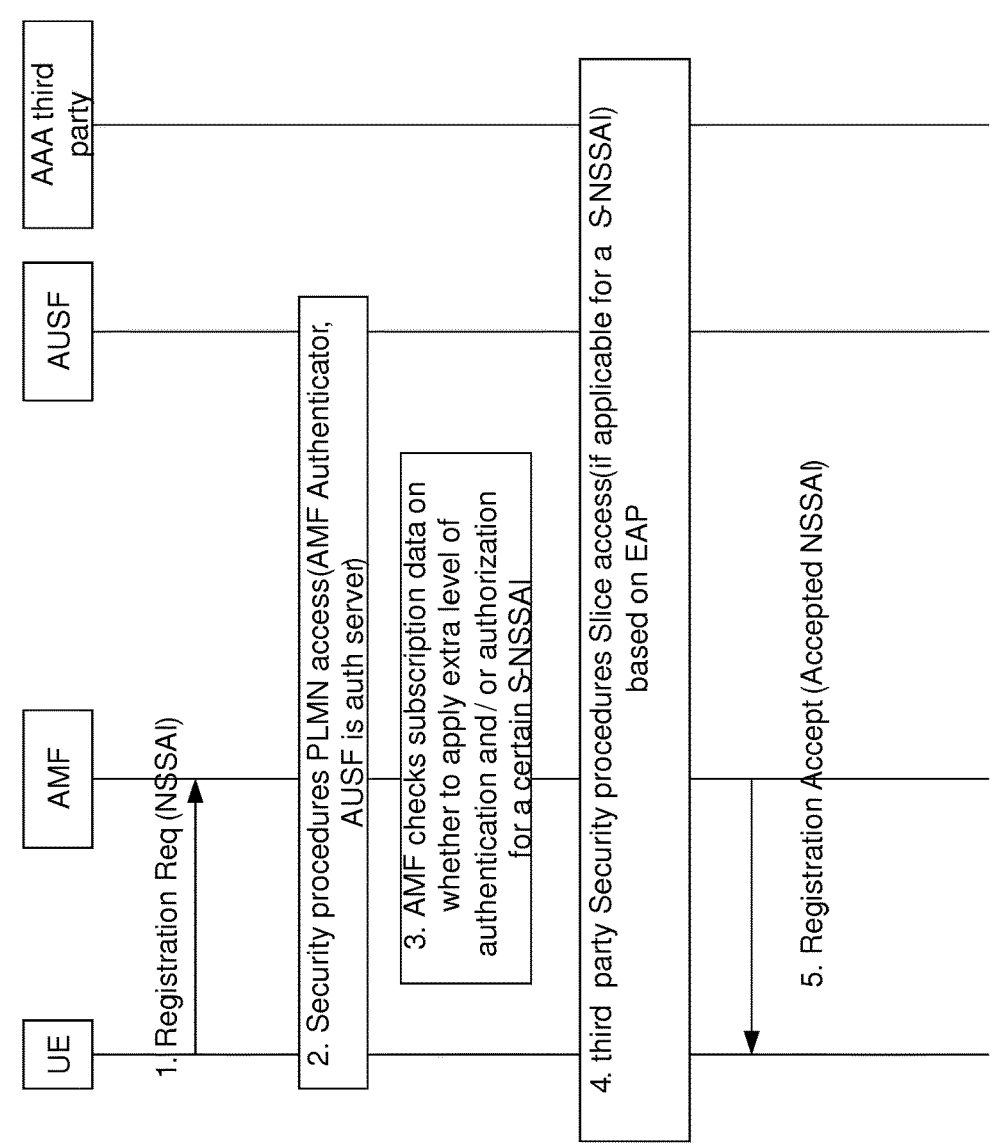
Figure 3:
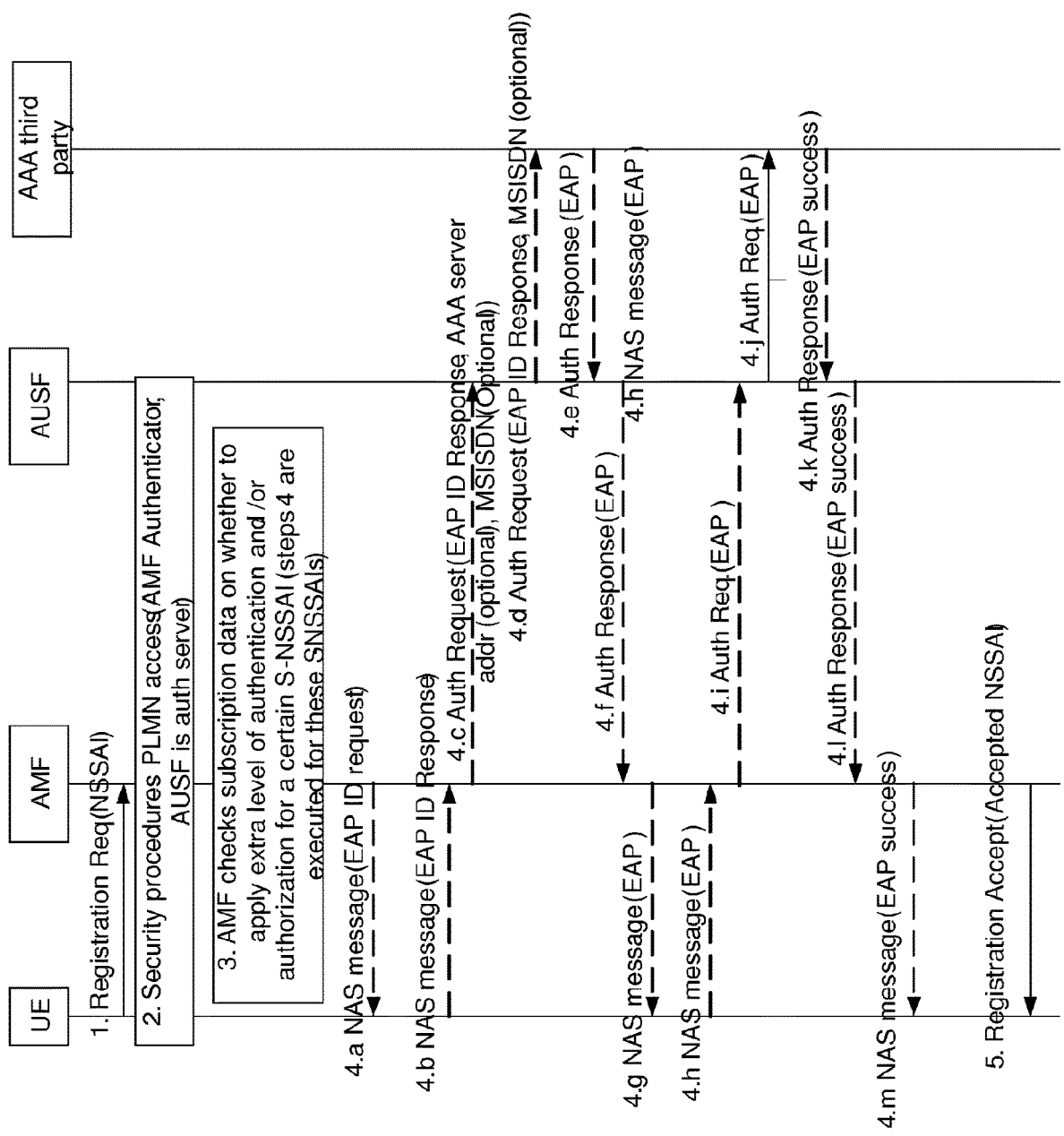

Some embodiments of apparatus and/or methods in accordance with embodiments of the present invention are now described, by way of example only, and with reference to the accompanying drawings, in which:
  FIG. 1 is intended to illustrate in a simplified way introducing in a mobile system an extra level of authentication of slice access with an external(third party) AAA server, according to embodiments of the invention,
  FIG. 2 is intended to illustrate in a simplified way an example of steps of a registration procedure according to embodiments of the invention,
  FIG. 3 is intended to illustrate in a simplified way an example of more detailed steps of a registration procedure according to embodiments of the invention.

ABBREVIATIONS

AAA Authentication, Authorization and Accounting
AMF Access and Mobility Management Function
AUSF Authentication Server Function
EAP Extensible Authentication Protocol
MSISDN Mobile Subscriber ISDN Number
NAS Non Access Stratum
NSSAI Network Slice Selection Assistance Information
PLMN Public Land Mobile Network
RAN Radio Access Network
RRC Radio Resource Control
SD Slice Differentiator
SDM Subscriber Data Manager
SMF Session Management Function
S-NSSAI Single-Network Slice Selection Assistance Information
SST Slice Service Type
UE User Equipment

DESCRIPTION OF VARIOUS ASPECTS AND/OR EMBODIMENTS OF THE INVENTION

In the following, embodiments of the invention will be described by way of example for the case of Next Generation (5G) system. However, embodiments of the invention are not limited to such example and apply more generally to mobile systems/networks using network slicing.

In the scope of TS 23.501 and TS23.502, it is possible for a UE to be simultaneously attached to more than one Network slice, via a single function called AMF. The AMF can be specialized for the set of Network slices the UE is attached to.

A network slice is conceptually like an end to end network. It is identified by the value of a S-NSSAI that is composed by a Slice Service type (SST) value and a Slice differentiator (SD) value. The set of slices a UE intends to use or is accepted by the network to use is defined by the NSSAI which is the collection of the S-NSSAIs of the slices that the UE is using. The SD field can be used to associate the slice to a third party which acts as a tenant of the operator provided Network slice. This tenant may have its own AAA database. Embodiments of the invention aim at allowing the tenant to authenticate and/or authorize its own subscribers with its own AAA database.

The UE subscribes to the network slices it is authorized to use. These are stored as subscribed to S-NSSAI in the HSS (now known in 5G as UDM=User Data manager).

The Authorization to access a slice is normally happening during a registration procedure where, after the UE is authenticated and authorized to access the PLMN, the subscription data points out which slices are allowed for the UE based on HSS/UDM stored data. The authentication of the UE with 3GPP credentials is via a function called AUSF (Authentication Server function). However this model assumes the tenant fully relies on the PLMN operator to perform A&A. in many cases the tenant may want to apply its one Authentication and/or authorization. Embodiments of the invention aim at allowing the slice tenant to apply its own authentication and/or authorization.

Some proposal to use the Data networks access authentication and authorization as in the existing system documented in TS 23.401 and TS 29.061 is not suitable as the data network may belong to a party that is not really the tenant itself but a customer of the tenant. Access to slice is also authorized at the time the registration happens and SM may not happen at the same time. also the UE is allowed to remain attached with no PDN connection and still some RAN level control plane policies may apply while no PDN connection is established. Embodiments of the invention aim at allowing steps of authentication and/or authorization applied by the tenant to happen during the registration procedure.

An example embodiment of registration procedure as illustrated in FIG. 2 or 3 may be used in a system as illustrated in the example embodiment of FIG. 1.

In some embodiments, the UE may be configured with information to associate an authentication method per slice if extra level of authentication is required to access a certain slice. In some embodiments, If the UE is configured to do so, an extra level of authentication may be performed after the UE is authenticated for PLMN access.

In some embodiments, the SDM stored subscription data may include per S-NSSAI whether the extra level of authentication and/or authorization is required. As illustrated in the example of FIG. 1, SDM may store subscribed slices as S-NSSAI, with indication of possible extra Authentication and/or Authorization.

In some embodiments, if extra level of authentication is required, the UE may be challenged to authenticate to the slice by the AMF and the UE may perform the extra level of authentication based on its configuration for the slice. The AMF may be directly connected to the AAA server of the tenant or the AUSF may proxy towards it. As illustrated in the example of FIG. 1, AMF may be authenticator of the UE for both PLMN access based on 3GPP credentials and also optionally slice access based on third party AAA credential.

In some embodiments, in addition or solely, if extra level of authorization is required this may come form the third party database, either while the UE is authenticated with it (so the third party performs A&A), or by submitting to the third party AAA server an Identity the PLMN can use externally (like the MS_ISDN or the external Id defined in TS 23.682) so the AAA server can check it is allowed to access the slice. In this case step 4 in FIG. 2 (4c, d, e, f in FIG. 3) would not involve the UE and just be between AMF and AAA server based on trusted UE identity check with the AAA database. In this case steps 4c and 4d would only include the MS-ISDN or the external ID, and step 4e and 4f would report a Success or Failure of UE authorization information to the AMF. The Third party AAA may also report in step 4e and 4f to the AMF a request to challenge the UE with the provided MS-ISDN or external ID, in which case the procedure would restart from step 4a.

In some embodiments, the UE may perform a registration request indicating the NSSAI including all the S-NSSAIs of the slices it intends to use (step 1 in FIG. 2 or 3). Security procedures for PLMN access (with AMF as authenticator and AUSF as authentication server) may be performed (step 2 of FIG. 2 or 3). The AMF at step 3 may check whether the UE is subscribed to each of these S-NSSAIs. If there is no subscription to one S-NSSAI, the S-NSSAI is not accepted. However, if there is subscription, further subscription information may exist to require the UE to be further authenticated and/or authorized by a third party. If so, the method of authentication, the need to indicate a UE external Identity to the third party (like MS-ISDN or UE external ID defined in 23.682) and the AAA server address where to send the authentication request may be included. Also, for each S-NSSAI for which third party authentication is required, step 4 in FIGS. 2 (4a to 4m in FIG. 3) may be executed. It may be assumed EAP is used as a flexible authentication protocols transport. The number of messages in step 4 sequence may depend on the exact EAP authentication method selected by the third party but those in the flow are just an example.

Also, since the UE performs periodic registrations, this step may not be required in periodic registrations. The AMF may, based on agreement with third party, report periodic registrations by using messages 4c,d,e,f only including the MSISDN (or external ID) once the MS-ISDN (or external ID) was associated to the third party user ID authenticated at initial registration if this was included in step 4c, 4d. So this method may also allow association of third party User ID and operator authenticated identities that may shortcut subsequent registrations and only periodically the third party may challenge again the UE with fresh third party authentication (to save AAA and network resources).

In step 5 (FIG. 2 or 3) the AMF may accept the registration including the NSSAI with the accepted S-NSSAIs (either based on just subscription check or based on third party successful authentication)

Embodiments of the invention may also be described in the following way.

The EPS offers packet data services according to a simple paradigm where a single access network serving a UE would provide access to a PDN. The access network authentication is based on PLMN authentication (3GPP AKA), which also provided the keys for wireless link ciphering. Optionally, if the PDN a UE needs to access was operated by a third party, this third part may require an additional level of authentication, allowing a UE to be denied access despite the HSS records indicated the UE was subscribed to the PDN's APN. This would allow a PDN operator to manage an independent set of credentials for its subscribers and establish or remove a customer-service provider relationship without needing to contact the operator.

As we move to the 5G system, in addition to the concepts indicated here above for EPS, which are still provided by the 5G system, we now have the concept of Network Slice.

Via the concept of network slice a PLMN operator can provide a certain service level/network services to a third party, in a wholesale type of agreement.

It needs to be discussed whether it is sufficient to use PLMN level authentication to allow a UE to access a slice that is offered to a third party.

It is quite possible that the third parties that enter in the SLA with the operator for the Network Slice may own their own subscriber base, or intend to have their own independent subscriber base based on an own Identity and credentials. So, it is desirable to allow the third party to authorize access to the slice via check on the subscriber database they own.

This slice tenant which requires the extra level of authentication and authorization, like the PDN operator in EPS, does trust that the PLMN provides a secure link based on PLMN access authentication, authorization and security, and that the PLMN operator would allow or deny access to the slice based on the result of tenant based authentication and authorization executed on top of the PLMN access authentication and authorization. So when the UE is accepted in the tenanted slice during registration procedures, optionally including the extra level of slice access authentication, there is the assumption that all other procedures related to the S-NSSAI of the slice can be executed. Note that since acceptance of a S-NSSAI happens at Registration time, the extra level of authentication needs to be at registration time.

Embodiments of the invention may include one or more of:

If a UE subscribes to a S-NSSAI pointing to a slice that needs third party authentication, this information is stored in the SDM (Subscriber Data Manager) as a flag indicating that his step is needed, and also the IP address of the AAA server that will perform the authentication.

When a UE performs a registration request where the S-NSSAI is requested, or where the S-NSSAI is assigned to the UE by default by the system as it is marked as default in SDM, then the AMF executes on top of any required PLMN specific authentication and authorization step, an authentication and Authorization step that is run with the UE and involves the AAA server of the third party. The IP address of the AAA server is carried in the Authentication messages towards the AUSF so the AUSF knows where to relay the Authentication request message from the AMF.

Alternately. If the User Id in the third party can be defined as a NAI (see RFC 4282 https://tools.ietf.org/html/rfc4282), i.e. the user ID is in the form user@domain, the IP Address is not needed in SDM and the correct AAA of the third party server is derived at AUSF by resolving the domain part of the NAI The UE is ready to execute these authentication procedures as it is configured for the S-NSSAI related to the Third-party slice with the necessary credentials and algorithms necessary to authenticate itself with the AAA server of the third party. It should be noted that the assumed transport protocol is EAP and so this poses no extra requirement on the N2 and N1 signalling as this is already used for 3GPP and non 3GPP access authentication, so this extra step is just reusing the existing authentication procedures transport.

Such proposal may be summarized as illustrated in FIG. 2

It may be observed that step 4 is optional but it should be executed before a S-NSSAI related to the slice for which the third-party authentication is required can be included in the Accepted NSSAI. If this step is not executed the UE is unable to execute the Session management procedures for the particular slice as the UE, before executing SM for a slice, should execute a registration with the slice using a registration procedure.

Thus, a third-party subscriber databased check should be allowed at registration time to admit a UE into a slice this third-party rents from the operator, and if so the necessary changes should be introduced in the Technical Specifications 3GPP TS 23.501 and 3GPP TS 23.502.

Embodiments of the invention are not aiming at replacing the Primary Authentication executed by the operator. If this was done, then the UE-CN security would be the one of the Network slice of the third party and this is not acceptable by current PLMNs. Also, this would not allow the coexistence of multiple slices for a single UE as the assumption is that there is a single Security termination point in the AMF and this is shared among Network Slices the AMF supports for a single UE. Clearly if the security is related to just one slice, this may not be satisfactory for the others.

Various aspects and/or embodiments of the invention include (though not being limited to) following aspects and/or embodiments.

Some aspects are related to a mobile network entity, such as Access and Mobility Management Function AMF, providing registration management functions in a mobile network supporting network slicing.

Various embodiments are provided, including (though not being limited to) following embodiments, which may be taken alone or in combination, according to various combinations.

In an embodiment, said mobile network entity is configured to:
  check if authentication and/or authorization involving a third party associated with a network slice is required for access to said network slice in addition to authentication and/or authorization for access to said mobile network, during registration,
  initiate said authentication and/or authorization involving said third party upon checking that said authentication and/or authorization involving said third party is required.

In an embodiment, said mobile network entity is configured to:
  perform said checking based on subscription data indicating whether said authentication and/or authorization involving said third party is required.

In an embodiment, said mobile network entity is configured to:
  receive from a subscriber data manager subscription data indicating whether said authentication and/or authorization involving said third party is required.

In an embodiment, said mobile network entity is configured to:
  act as an authenticator in an authentication and/or authorization procedure involving said third party.

In an embodiment, said mobile network entity is configured to:
receive from a subscriber data manager subscription data containing address information of a AAA server associated with said third party, referred to as third party AAA server.

In an embodiment, said mobile network entity is configured to:
interact with a AAA server associated with said third party, referred to as third party AAA server, in an authentication and/or authorization procedure involving said third party.

In an embodiment, said mobile network entity is configured to:
interact with a mobile network entity such as AUSF providing authentication server functions in an authentication and/or authorization procedure involving said third party.

In an embodiment, said mobile network entity is configured to:
send towards a mobile network entity such as AUSF providing authentication server functions, in an authentication and/or authorization procedure involving said third party, at least one of:
address information of a AAA server associated with said third party, referred to as third party AAA server,
public user identity information, such as MSISDN.
The User ID of a User recorded in a third party AAA server In an embodiment, said mobile network entity is configured to:
send towards a User Equipment UE an indication that said registration is accepted if said authentication and/or authorization for access to said mobile network, and said authentication and/or authorization for access to said network slice, have been performed successfully.

In an embodiment, said mobile network entity is configured to:
send towards a User Equipment UE, in a registration message, an Accepted NSSAI if said authentication and/or authorization for access to said mobile network, and said authentication and/or authorization for access to said network slice, have been performed successfully.

Other aspects are related to a mobile network subscriber database, such as SDM, for a mobile network supporting network slicing.

Various embodiments are provided, including (though not being limited to) following embodiments, which may be taken alone or in combination, according to various combinations.

In an embodiment, said mobile network subscriber database is configured to:
store subscription data indicating whether authentication and/or authorization involving a third party associated with a network slice is required for access to said network slice, in addition to authentication and/or authorization for access to said mobile network.

In an embodiment, said mobile network subscriber database is configured to:
provide said subscription data to a mobile network entity such as AMF supporting registration functions, during registration.

In an embodiment:
said subscription data include address information of a AAA server associated with said third party, referred to as third party AAA server.

Other aspects are related to a User Equipment for a mobile system supporting network slicing.

Various embodiments are provided, including (though not being limited to) following embodiments, which may be taken alone or in combination, according to various combinations.

In an embodiment, said User Equipment is configured to:
support authentication and/or authorization involving a third party associated with a network slice, for access to said network slice, in addition to authentication and/or authorization for access to said network, if required for said network slice, during registration.

In an embodiment, said User Equipment is configured to:
store configuration information for performing an authentication and/or authorization procedure involving said third party for access to said network slice.

In an embodiment, said User Equipment is configured to:
interact with a mobile network entity such as Access and Mobility Management Function AMF providing registration management functions, in an authentication and/or authorization procedure involving said third party for access to said network slice.

Other aspects are related to a mobile network entity, such as AUSF, providing authentication server functions in a mobile network supporting network slicing.

Various embodiments are provided, including (though not being limited to) following embodiments, which may be taken alone or in combination, according to various combinations.

In an embodiment, said mobile network entity is configured to:
relay information exchanged between a mobile network entity such as Access and Mobility Management Function AMF providing registration management functions, and a AAA server referred to as third party AAA server associated with a third party associated with a network slice, in an authentication and/or authorization procedure performed for access to said network slice.

In an embodiment, said information include at least one of:
address information of said third party AAA server,
public user identity information such as MSISDN,
a User ID of a User recorded in said third party AAA server.

Other aspects are related to a method for enhanced registration in a mobile system supporting network slicing, said method including at least one step performed by at least one of the thus configured entities: a mobile network entity such as Access and Mobility Management Function AMF providing registration management functions, a mobile network subscriber database such as SDM, a User Equipment UE, a mobile network entity such as AUSF providing authentication server functions.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising
at least one processor; and
at least one memory including computer program code;
the at least one memory and the computer program code configured to, with the at least one processor, cause the apparatus at least to:
perform a registration procedure for registering to a network, wherein said registration procedure is performed before performing a session management procedure for a network slice in an instance access to the network slice involves a third-party authentication authorization and accounting server, and
support authentication and/or authorization involving the third party authentication authorization and accounting server for access to the network slice, in addition to authentication and/or authorization for access to said network, if required for said network slice, during said registration procedure.

2. The apparatus according to claim 1, wherein the at least one memory and the computer program code are configured to, with the at least one processor, cause the apparatus to perform:
interact with a network entity providing registration management functions, in an authentication and/or authorization procedure involving said third party authentication authorization and accounting server.

3. The apparatus according to claim 1, wherein the at least one memory and the computer program code are configured to, with the at least one processor, cause the apparatus to perform:
store configuration information for performing an authentication and/or authorization procedure involving said third party authentication authorization and accounting server.

4. The apparatus according to claim 1, wherein the at least one memory and the computer program code are configured to, with the at least one processor, cause the apparatus to perform:
receive an indication that said registration is accepted if said authentication and/or authorization for access to said network and said authentication and/or authorization for access to said network slice have been performed successfully.

5. The apparatus according to claim 1, wherein the at least one memory and the computer program code are configured to, with the at least one processor, cause the apparatus to perform:
receive an accepted single network slice selection assistance information if said authentication and/or authorization for access to said network and said authentication and/or authorization for access to said network slice have been performed successfully.

6. A method comprising:
performing a registration procedure for registering to a network, wherein said registration procedure is performed before performing a session management procedure for a network slice in an instance access to the network slice involves a third-party authentication authorization and accounting server, and
supporting authentication and/or authorization involving the third party authentication authorization and accounting server for access to the network slice, in addition to authentication and/or authorization for access to said network, if required for said network slice, during said registration procedure.

7. The method according to claim 6, comprising:
interacting with a network entity providing registration management functions, in an authentication and/or authorization procedure involving said third party authentication authorization and accounting server.

8. The method according to claim 6, comprising:
storing configuration information for performing an authentication and/or authorization procedure involving said third party authentication authorization and accounting server.

9. The method according to claim 6, comprising:
receiving an indication that said registration is accepted if said authentication and/or authorization for access to said network and said authentication and/or authorization for access to said network slice have been performed successfully.

10. The method according to claim 6, comprising:
receiving an accepted single network slice selection assistance information if said authentication and/or authorization for access to said network and said authentication and/or authorization for access to said network slice have been performed successfully.

11. An apparatus comprising
at least one processor; and
at least one memory including computer program code;
the at least one memory and the computer program code configured to, with the at least one processor, cause the apparatus at least to perform:
provide registration management functions, wherein said registration management functions include a registration procedure, and wherein said registration procedure is performed before performing a session management procedure for a network slice in an instance access to the network slice involves a third-party authentication authorization and accounting server,
check if authentication and/or authorization involving the third party authentication authorization and accounting server is required for access to the network slice, in addition to authentication and/or authorization for access to said network, during a registration procedure, and
initiate said authentication and/or authorization involving said third party authentication authorization and accounting server upon checking that said authentication and/or authorization involving said third party authentication authorization and accounting server is required.

12. The apparatus according to claim 11, wherein the at least one memory and the computer program code are configured to, with the at least one processor, cause the apparatus to perform:
interact with a user equipment, in an authentication and/or authorization procedure involving said third party authentication authorization and accounting server.

13. The apparatus according to claim 11, wherein the at least one memory and the computer program code are configured to, with the at least one processor, cause the apparatus to perform:
provide an indication that said registration is accepted if said authentication and/or authorization for access to said network and said authentication and/or authorization for access to said network slice have been performed successfully.

14. The apparatus according to claim 11, wherein the at least one memory and the computer program code are configured to, with the at least one processor, cause the apparatus to perform:
provide an accepted single network slice selection assistance information if said authentication and/or authorization for access to said network and said authentication and/or authorization for access to said network slice have been performed successfully.

* * * * *